Nov. 23, 1943. W. C. HEATH 2,335,181
METHOD OF MANUFACTURING GRATING
Filed April 30, 1942

William C. Heath
INVENTOR.

BY Elwin A. Andrus
ATTORNEY.

Patented Nov. 23, 1943

2,335,181

UNITED STATES PATENT OFFICE 2,335,181

METHOD OF MANUFACTURING GRATING

William C. Heath, Shorewood, Wis., assignor to A. O. Smith Corporation, Milwaukee, Wis., a corporation of New York Application April 30, 1942, Serial No. 441,076

2 Claims. (Cl. 219—10)

This invention relates to a method of manufacturing grating as by welding. It has found employment in the manufacture of grating such as that disclosed and claimed in the copending application of the present inventor, filed March 27, 1941, Serial No. 385,478 and entitled "Welded grating."

The principal object of the invention is to provide a more simple and less costly method of making gratings.

According to the invention the grating is made up of longitudinal and cross bars of rolled strip metal disposed on edge and assembled to intersect in slots and the bars are electric resistance welded together at the bottom of the slots without mushing of the parts and preferably in a plane near the neutral axis of the structure. Any side crevices at the intersections should be filled with galvanizing or other material to increase the rigidity of the structure.

The accompanying drawing illustrates the method of the invention.

Figure 1:
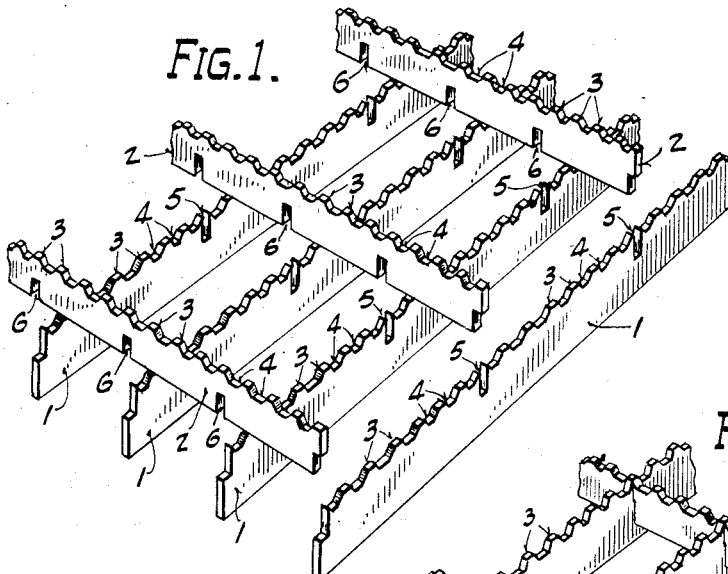
Figure 1 is a perspective view showing a plurality of longitudinal bars arranged parallel to one another and in spaced relation, with a plurality of cross bars disposed above the same for assembly therewith.
Figure 2:
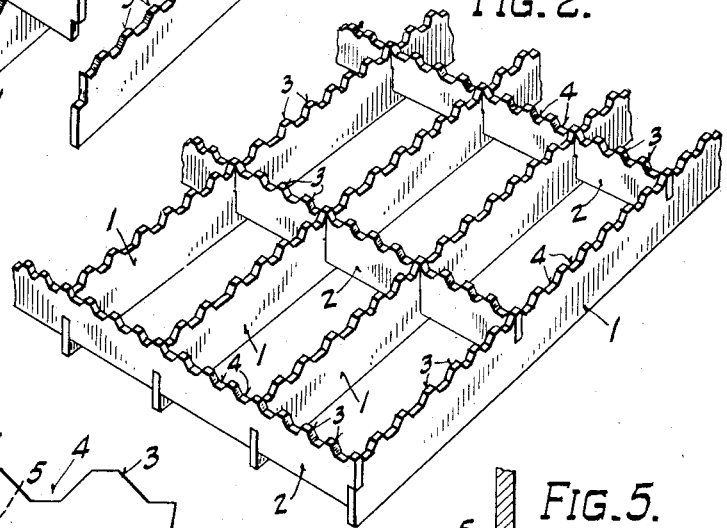
Fig. 2 is a similar view showing the bars assembled in the respective slots in one another.
Figure 3:
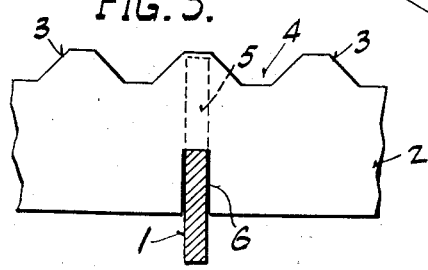
Fig. 3 is an enlarged transverse vertical sectional view through an intersection.
Figure 5:
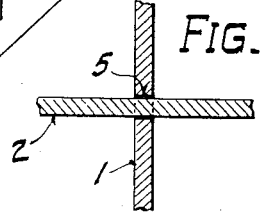
Fig. 5 is a sectional view of an intersection taken on the line 5—5 of Fig. 4.

The strips constituting the longitudinal bars 1 and the cross bars 2 are of rolled sheet metal and are serrated on one edge to provide an upper tread surface having alternate projections 3 and depressions 4. The upper edges of the longitudinal bars additionally contain slots 5 of a width just sufficient to accommodate insertion therein of the cross bars 2, and the latter have slots 6 in their lower edges of a width just sufficient to accommodate insertion therein of the longitudinal bars 1. The slots 5 and 6 may be cut or punched in the respective bars at the same time as the projections 3 and depressions 4 are cut or formed therein.

In assembling the bars 1 and 2, the latter are pressed into the aligned slots 5 in a plurality of parallel longitudinal bars 1 and the slots determine the spacing of the cross bars. Likewise the longitudinal bars 1 enter the slots 6 in the cross bar, and the spacing of slots 6 determines the spacing of the longitudinal bars.

This provides an assembly in which the intersections of the bars 1 and 2 are constructed to rigidly hold the respective bars in vertical upright position, and in which the meeting of the horizontal edges of the bars occurs in a plane intermediate the top and bottom of the structure. The upper tread surfaces of the respective bars lie in the same general plane. The lower edges of the bars need not lie in the same plane and generally it will be sufficient to construct the cross bars 2 of less vertical depth than the longitudinal bars 1. The cross bars 2 may not be slotted, provided the slots in the longitudinal bars 1 are of the same depth as the cross bars 2.

Figure 4:
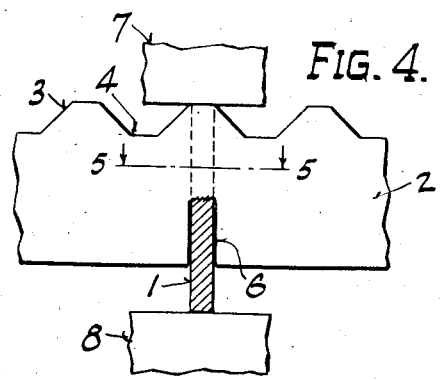
Fig. 4 is a similar sectional view showing the welding operation completed.
Figure 6:
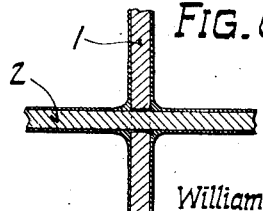
Fig. 6 is a similar section after galvanizing.

After assembly of the bars 1 and 2, as described, the bars are welded together by applying an upper electrode 7 engaging the upper edges of the cross bars 2 and a lower electrode 8 engaging the lower edges of the longitudinal bars 1. The structure is lightly pressed between the electrodes and a very light resistance welding current is applied through the electrodes and across the contacting surfaces at the bottoms of slots 5 and 6, as shown in Fig. 4.

No attempt is made to weld the parts at the sides of the slots and it has been found that a grating of fully sufficient strength can be obtained without substantial mushing of the parts together in welding. By welding in a plane intermediate the upper and lower edges of the respective bars, all parts are enabled to carry their respective loads and stresses with greater freedom from eccentricity. The slotting of both longitudinal and cross bars provides an interlocked structure of great stiffness.

Following the welding operation the grating is usually pickled and then galvanized or otherwise suitably coated. The galvanizing tends to fill the crevices at the side walls of the slots and provides a more rigid structure as well as protecting the steel from rust.

The invention may have various embodiments within the scope of the accompanying claims.

I claim:

1. The method of manufacturing welded grating from a series of longitudinal bars of strip metal and a series of cross bars of strip metal, comprising cutting regularly spaced slots with vertical side walls in the upper edge of the bars of one set, assembling the bars of the other set in the respective slots to provide an interlocked assembly with an upper tread surface, and welding the bars of one series to the bars of the other by lightly pressing the same between electrodes while applying a light electric resistance welding current across the contacting surfaces of the respective bars at the bottom of said slots only.

2. The method of manufacturing welded grating from a series of longitudinal bars of strip metal and a series of cross bars of strip metal, comprising cutting regularly spaced slots with vertical side walls in the upper edge of the bars of one set, assembling the bars of the other set in the respective slots to provide an interlocked assembly with an upper tread surface, welding the bars of one series to the bars of the other by lightly pressing the same between electrodes while applying a light electric resistance welding current across the contacting surfaces of the respective bars at the bottom of said slots only, and filling the interstices between the vertical side walls of the slots and the sides of the respective bars disposed therein with galvanizing material or the like to provide a rigid structure.

WILLIAM C. HEATH.